April 18, 1944.  H. G. LEHMANN  2,346,924
COFFEE MAKER
Original Filed Sept. 8, 1939
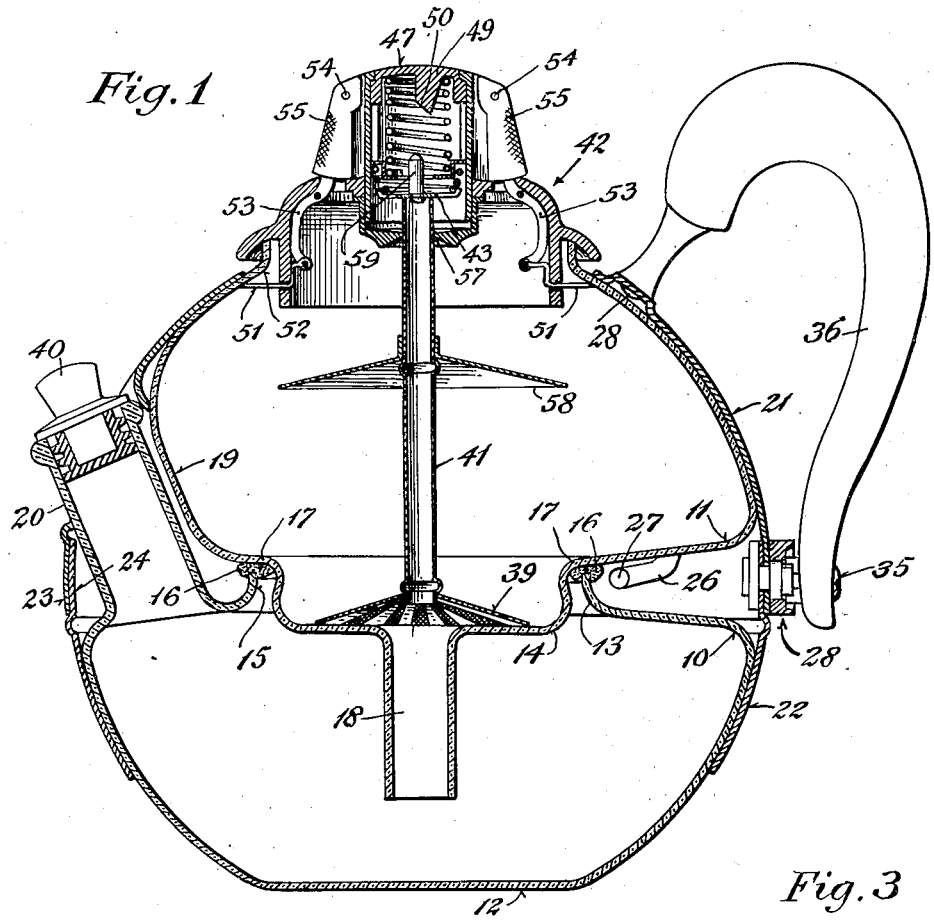
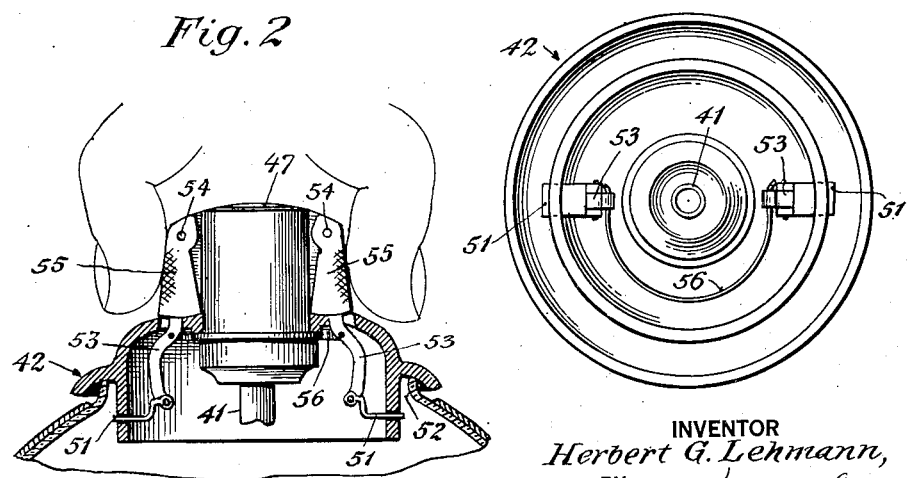
INVENTOR
Herbert G. Lehmann,
BY
Johnson, Kline and Smith
ATTORNEYS Patented Apr. 18, 1944

2,346,924

UNITED STATES PATENT OFFICE 2,346,924

COFFEE MAKER

Herbert G. Lehmann, Bridgeport, Conn., assignor to Casco Products Corporation, Bridgeport, Conn., a corporation of Connecticut Original application September 8, 1939, Serial No. 293,875. Divided and this application February 26, 1942, Serial No. 432,431

1 Claim. (Cl. 99—292)

This invention relates to vacuum type coffee makers, and, more particularly, to the cap and cover for the upper or extracting vessel thereof and to the means for fastening said cap or cover thereon.

This application is a division of my copending application Serial No. 293,875, filed September 8, 1939, now Patent No. 2,286,990, issued June 16, 1942.

In coffee makers of the vacuum type, it was heretofore the custom to provide a lower vessel with a single opening or orifice into which a hollow stem on the upper vessel extends and by the walls of which the upper vessel is supported. Consequently, to pour the brewed coffee from the lower vessel, it was necessary to remove the upper vessel and store it in some safe place. The storing of the upper vessel is frequently quite a problem, for it cannot be supported upright, except on a spindle-like holder which passes through the tube at the bottom of the vessel, and when so supported is easily tipped over because the main weight of the body is so high above the supporting surface.

Another difficulty with the vacuum type coffee makers as heretofore constructed has been the danger of the coffee maker tipping over while the coffee is being brewed, for the weight of the water when forced into the upper vessel moves the center of gravity high above the relatively limited supporting surface of the lower vessel. Besides, when the water from the lower vessel has been expelled to a point where the level thereof is below the orifice of the downwardly projecting tube, bubbles of air are forced up through the liquid in the upper vessel causing considerable agitation and frequently breaking the air-tight seal between the tube and the neck of the lower vessel.

The difficulties above referred to are obviated in the device of the present invention by the provision of a coffee maker of the vacuum type in which the upper vessel and the lower vessel may remain united as one, both while the coffee is being made and while it is being poured from the coffee maker after being brewed. This arrangement permits coffee to be brewed and served at the dining table without the inconvenience and bother which is now attendant upon the removal of the upper vessel after the coffee is brewed and before it may be served. By this arrangement, the seal between the upper and lower chamber is mechanically maintained so that there is no likelihood of seepage of air into the lower vessel through this seal, which seepage would delay the return of the brewed coffee to the lower vessel and might even prevent the return of some of the brewed coffee to the lower vessel.

The upper and lower vessels of the vacuum type coffee maker of the present invention are so shaped that together they form a substantially spherical body, the two vessels being united in such a manner that they can be lifted and transported by a suitable handle as one vessel.

A spout is provided on the lower vessel through which the brewed coffee may be served and which may be completely stopped over during the operation of the device so that the water in the lower vessel will be forced up into the upper vessel by expansion of the water and the air above it.

Means is provided for permitting air to enter the lower vessel so that the brewed coffee may pass through the pouring spout without being impeded either by the partial vacuum which would otherwise be formed in the lower vessel or by in-rush of air trying to enter the lower vessel through the pouring spout, said means being so constructed as to permit air or water from escaping therethrough while the coffee is being brewed.

According to the present invention, a cap or cover is provided for the upper vessel which is securely locked in place so that it is prevented from falling off or from being raised by the liquid in the upper vessel during use of the coffee maker, and a fastening mechanism of simple construction is provided for said cap, the mechanism being readily and conveniently manipulated to lock the cap or cover in position or to release it for removal from the coffee maker. The cap also contains a valve mechanism for controlling the air-inlet means above referred to and contains a cavity for supporting a stopper for the coffee spout after the coffee is brewed.

Preferably, the insertion of the stopper in the cover or cap automatically operates the valve to admit air to the lower vessel.

Other features and advantages will hereinafter appear.

In the accompanying drawing which shows one form of the invention—

Figure 1 is a vertical section through the coffee maker of the present invention showing the parts in the positions which they occupy during the brewing of the coffee.

Fig. 2 is a sectional view of the top portion of the upper vessel showing the cover or cap unlocked therefrom and ready to be removed.

Fig. 3 is a bottom plan view of the cap of the parts in the position shown in Fig. 2.

As shown in the accompanying drawing, and referring particularly to Fig. 1, the coffee maker of the present invention comprises a lower vessel 10 and an upper vessel 11, each vessel being approximately hemispherical and having their relatively flat sides adjacent so that when they are assembled, they will form a substantially spherical body.

The bottom of the lower vessel 10 is provided with a flat surface 12 by means of which the coffee maker may be supported, and at its upper end the vessel 10 has a relatively wide open mouth 13 adapted to receive a sump portion 14 of the upper vessel 11. A lip 15 of the mouth 13 supports a gasket 16 of rubber or other suitable material which is engaged by a bottom portion 17 of the upper vessel 11 and supports the upper vessel on the lower vessel with the sump 14 extending into the lower vessel. The upper vessel has the usual downwardly extending tube 18 through which water contained within the bottom vessel 10 when heated will pass upwardly through ground coffee in the sump 14 and into the upper vessel 11 where the coffee is brewed.

As shown in Fig. 1, the upper vessel 11 is flattened or otherwise suitably shaped at 19 to provide space for an upwardly extending spout 20 connected to the lower vessel and through which the brewed coffee may be poured when serving.

The lower vessel 10 and upper vessel 11 are united as one, and for this purpose any suitable means may be employed. However, it is at present preferred to unite the two vessels by providing two properly shaped casings 21 and 22 overlying and underlying respectively the largest dimensions by the vessels 11 and 10. These casing parts are provided with overlapping marginal portions 23 and 24 which are secured together, and the upper casing 21 is provided with an aperature 25 through which the spout 20 extends.

The casing parts 21 and 22 are secured together by bayonet locks comprising slots 26 in the part 22 and pins 27 in the part 21. After the vessels 10 and 11 are superposed, the parts 21 and 22 are placed over and under them so that the pins 27 enter the openings of the slot 26, whereupon the lower part is turned relative to the upper part causing the parts to be drawn together by the inclined walls of the slots 26.

To facilitate relative movement between the parts 21 and 22 of the casing, an actuating mechanism 28 more fully described in the aforementioned parent application is employed. Said mechanism includes a screw 35 by means of which a handle 36 may be secured to the casing. The upper end of the handle is suitably secured as by a rivet 28 to the upper portion of a casing part 21. The lock pins and the locking mechanism 28 are located in the space between the bottom of the upper vessel and the top of the lower vessel.

Any suitable filter or strainer may be used to retain the coffee grounds in the sump 14 or other lower part of the upper vessel 11.

In the form of the invention herein disclosed, this is accomplished by providing an apertured plate 39 which fits over the opening at the upper end of the tube 18 and which may be covered with suitable cloth to strain the brewed coffee and prevent the grounds from passing down into the lower chamber.

While the water is being heated to drive it up into the vessel 11, it is, of course, essential to prevent the escape of air from the lower vessel 10, because it is the expansion of the water and air in the lower vessel 10 which causes the water to rise in the tube 18. For this purpose, the spout 20 is provided with a stopper 40 which, of course, may be removed when it is desired to pour the brewed coffee.

When brewed coffee is to be poured from the lower vessel 10, it is necessary for the liquid removed to be replaced by air. I have found that the ground coffee in the sump 14 packs so tightly that sufficient air cannot enter the lower vessel through the compacted and wet ground coffee. I have also found that if the brewed coffee is poured rapidly from the spout 20, the in-rush of air tends to gurgle and causes the coffee to be spattered rather than to fall in a smooth stream into the cup.

According to the present invention in its broader aspects, any suitable means may be employed for introducing air to the lower vessel 10 when pouring the coffee through the spout 20. In the specific embodiment of the invention illustrated herein as exemplary thereof, this is accomplished by providing an air inlet tube 41, and conveniently this air inlet tube may be secured to and be supported by the filter plate 39. This tube extends upwardly through the upper vessel 11 and to a point near the top thereof, and is held closed against the passage of air or water while the water in the lower vessel 10 is being heated. Otherwise, the heated water would not be forced into the upper vessel 11.

When the button 47 is pushed down, the incline or cam 50 on the lug 49 engages the pin 59 and tilts the valve disk to one side, thereby raising the disk from one side of the tube 41 and permitting air to enter the tube.

The button 47 may be held down in any suitable way, but, according to the invention in its illustrated form, the button is operated and maintained depressed by the stopper 40, which, when it is removed from the spout 20, may be placed against the button 47 and pressed downwardly where it remains until again removed.

Thus, not only is the air vent valve automatically operated by the insertion of the stopper, but a convenient place to store the stopper during the pouring of the coffee is provided.

The cap 42 does not have an air-tight connection with the upper vessel 11, and therefore the interior of the upper chamber also has free communication with the atmosphere.

According to the present invention, the cap 42 is secured in place on the top of the upper vessel 11. This means provided for this purpose by the present invention comprises a pair of slide bolts 51 adapted to be projected under a curved shoulder 52 provided at the mouth of the vessel 11 and pivotally attached to arms 53 which are pivoted at 54 and having finger pieces 55 by means of which they may be swung inwardly. The finger pieces 55 extend outwardly through slots in the cap 42 and are held in their outward position with the slide bolts 51 in the position shown in Fig. 1 by a spring 56 shown in Fig. 3.

The slide bolts 51 engaging the downwardly and outwardly inclined surface of the upper vessel and being spring pressed outwardly, tend to draw the cap 42 tightly against the mouth of the vessel 11, holding the valve disk 43 against the air inlet tube, even though there may be the ordinary variations of the size and shape of the vessel 11.

The cap 42 is provided with a central aperture 57 through which the upper end of the air inlet tube 41 extends and by which it is centralized and supported against tilting over.

To prevent fluid which bubbles in the upper vessel 11 from splashing out through the apertures in the cap 42, a deflector plate 58 may be provided on the air inlet tube as shown in Fig. 1. Thus, it will be seen that one single removable piece serves as a filter support and air inlet tube and a baffle. When the cap 42 is removed, this piece may be easily removed through the open top of the vessel 11 for cleansing.

Variations and modifications may be made within the scope of this invention and portions of the improvements may be used without others.

I claim:

In a coffee maker of the vacuum type having an upper vessel provided with an aperture, a cover for said aperture in the upper vessel, said cover having a portion extending into said aperture, a pair of slide bolts carried by said inwardly extending portion of the cover on opposite sides thereof and radially projectable and retractable relative to the axis of the cover, an inwardly faced shoulder formed on the interior of the upper vessel adjacent its upper end adapted to engage said slide bolts upon projection thereof and to release them upon their retraction; a U-shaped spring normally urging said slide bolts to projected position; a pair of pivoted levers for operating said slide bolts; and a pair of manually operable grip members connected to said levers for retracting said slide bolts to release the cover for removal from the vessel without movement of the cover relative to the vessel.

HERBERT G. LEHMANN.